UNITED STATES PATENT OFFICE.

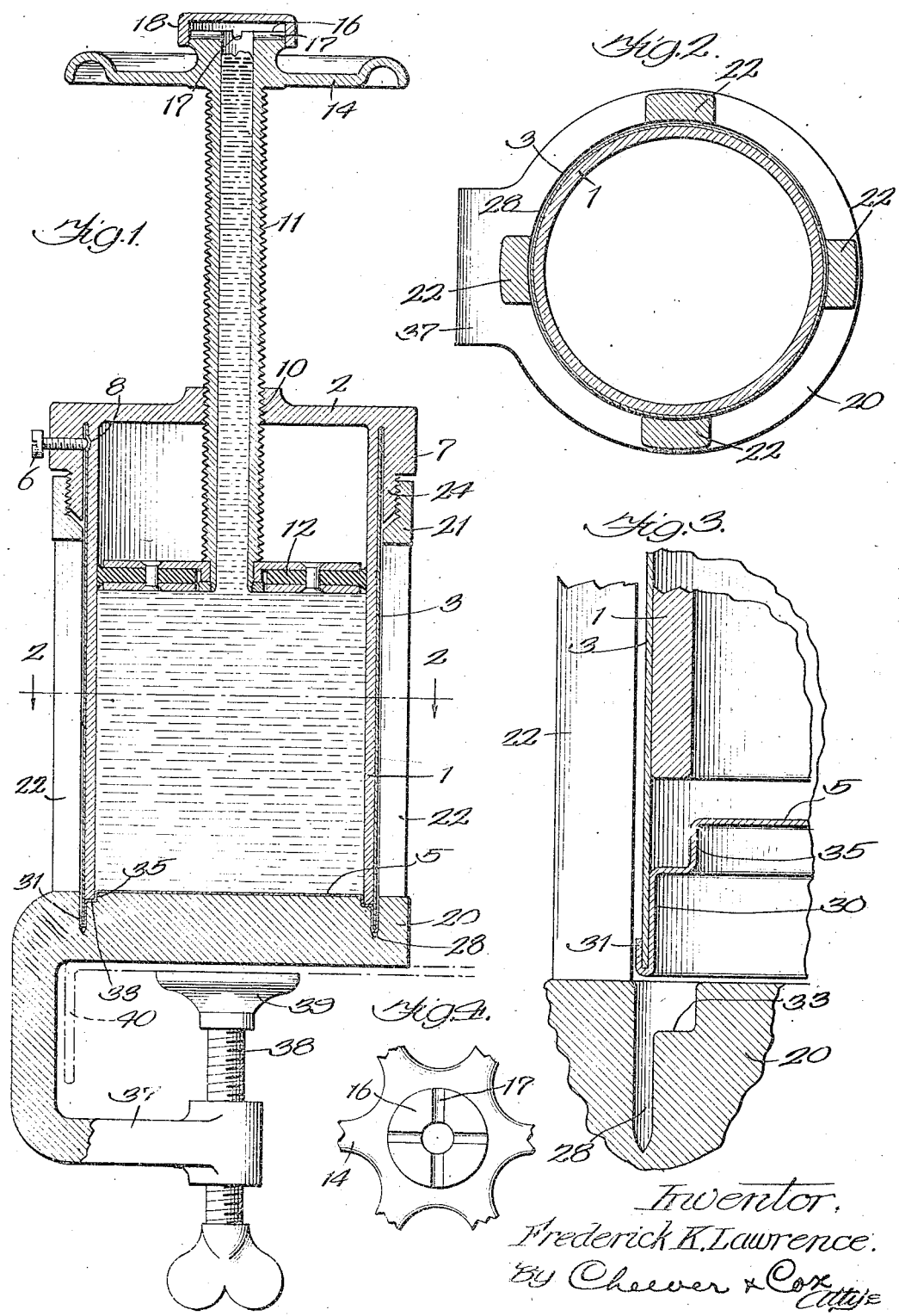
F. K. LAWRENCE.
GREASE CUP FILLER.
APPLICATION FILED JUNE 21, 1918.
1,341,652.
Patented June 1, 1920.
Inventor,
Frederick K. Lawrence.
By Cheever & Cox
Attys

FREDERICK K. LAWRENCE, OF CHICAGO, ILLINOIS.

GREASE-CUP FILLER.

1,341,652.

Specification of Letters Patent.

Patented June 1, 1920.

Application filed June 21, 1918. Serial No. 241,100.

*To all whom it may concern:*

Be it known that I, FREDERICK K. LAWRENCE, a citizen of the United States, residing at Chicago, in the county of Cook and State of Illinois, have invented a certain new and useful Improvement in Grease-Cup Fillers, of which the following is a specification.

My invention relates to fillers for grease cups and like devices. It is of special utility in connection with cups which are removable from the machinery they are intended to lubricate. To illustrate: The grease cups commonly used on automobiles consist of cup-like receptacles screwing onto a base having a duct leading to the part to be lubricated. When the grease cup needs refilling the cap which forms the reservoir is removed whereupon the operator proceeds to fill it, usually by dipping out the grease from the can by the aid of a stick or his fingers. The method is at best "mussy" and has the added disadvantage of being apt to introduce grit. Of course a grease gun may be employed, but in this case the gun itself must be previously filled. The general object of my invention is to provide a clean, quick acting, economical, and efficient means for filling grease cups, grease guns and the like. A contributory object is to provide means for utilizing the container in which the grease is marketed, as a part of the apparatus. Another object is to provide means whereby the device may be temporarily fastened to the running board of a motor vehicle or to a work bench or any other convenient support. Other contributory objects will become apparent as the description proceeds.

I accomplish my objects by the mechanism shown in the accompanying drawings in which—

Figure 1 is an axial section of the complete device.

Fig. 2 is a plan section on the line 2—2 of Fig. 1.

Fig. 3 is an enlarged vertical section showing the relationship of some of the parts near the base of the can.

Fig. 4 is a plan view of the operating wheel and wiper top.

Similar numerals refer to similar parts throughout the several views.

In the particular form selected to illustrate the invention there is a sleeve or insert 1 which is cylindrical and open at the bottom and depends from a top 2. It is of such external diameter as to enable it to fit closely inside of a grease can 3. The sizes of these cans are usually standard, and my device is so proportioned that the sleeve 1 will fit snugly but slidingly into the can. After it has been forced down as far as it will go it is fastened by suitable clamping means, for example, set screws 6 of which there are usually four. These set screws are mounted in an annular flange 7 which passes over the upper edge of the can and down for an appreciable distance along the outside of it as shown in Fig. 1. By preference, depressions 8 are formed in the external surface of the sleeve opposite to the inner end of the set screws so that when the screws are screwed up tight they will force the metal of the can into the depressions and thus clamp the parts tightly in position.

At the center of the top 2 of the sleeve is an internally threaded aperture 10 into which screws the externally threaded hollow stem 11. At the lower end said stem has a piston or plunger 12 which is secured to it in any suitable manner. The stem is provided with a hand wheel 14 for rotating it and at the top of the stem is a surface 16 having radial grooves 17. When the wheel is rotated in a direction to lower the plunger the grease is forced up through the stem and exudes up through the surface 16 in the form of a cylindrical column. A screw cap 18 is provided to form a closure when the device is not in use. The surface 16 forms a "wiper top" for when the upwardly projecting grease is to be transferred to the cap of the grease cup the operator merely places the cap, open end down, on surface 16 and then sweeps it sidewise, thus causing the grease to adhere to the inside of the cap.

The parts above described are operative in themselves under certain conditions, for it will be evident that the bottom 5 of the can will form a closure for the bottom of the sleeve 1 where the parts have been assembled as shown in Fig. 1; and when the stem 11 is screwed down the grease will be forced up through it. No particular form of can is required so long as it is substantially cylindrical and of a size for which the sleeve 1 is adapted. But to increase the utility of the device under ordinary circumstances I have provided means for holding it upon a suitable support and have provided means for reinforcing the bottom of the can to prevent it from bulging downward in case it is too thin to stand the pressure. The supplemental elements are shown in the drawings and consist primarily of a base 20 above which is a ring 21 connected to it by upright bars 22. The ring 21 is internally threaded to screw upon an externally threaded flange 24 which depends from the flange 7 previously mentioned. The parts are so designed that when the ring 21 is screwed up on flange 24, platform 20 will be brought up snugly against the bottom 5 of the can. Under certain conditions it is desirable to employ grease cans of special configuration in which the sides are extended down below the level of the bottom 5 and a flange is formed at the rim of the bottom to fit the sides. In this form the lower edge of the flange 30 is bent up around the lower edge of the sides and forms a lip 31. This makes an overlapped joint which may enter the annular groove 28. By preference the bottom of said groove is V-shaped and hence when the lower end of the can is forced into it the elements are pinched together and thus make a joint which is oiltight and prevents any of the grease exuding when pressure is exerted by the plunger 12. As an added precaution it is desirable to form an annular recess 35 in the can bottom for receiving the lower end of the sleeve 1. This seats upon a bench 33, formed in the platform 20, and when the parts are assembled as in Fig. 1, not only will the pressure be carried by the platform 20, but the sleeve will make a tight joint with the bottom of the can.

The platform 20 is desirably provided with a clamp for securing the device to an appropriate support. In the design shown a bent arm 37 extends down from one edge of the platform and is provided with a clamping screw 38, having a foot 39 adapted to engage the bottom of the support 40. This support may be in the form of a work bench, or the running board of a motor vehicle.

The operation will now be readily understood. Assuming the invention to be embodied in its most complete form as shown in the drawings, the stem is first backed off until the plunger stands at or near the top of the sleeve 1. The sleeve is then lowered into the grease can and finally screwed into the ring 21 until the lower end of the sleeve seats snugly in the groove 35 at the bottom of the can. Toward the last, if the special described can is used, the flanges 30, 31 will be forced down into the V-shaped bottom of the groove 28 and be tightly sealed by the wedging action of the bottom of the groove. If the can is now provided with the downward extending flange 30 the operator will not lower the sleeve quite so far, and the bottom of the can simply will rest upon the platform. When the operator wishes to fill a grease cup he first gives a turn or so to the hand wheel 14 which lowers the plunger and forces the grease up through the stem. The grease is stiff and projects upward from the surface of wiper top 16. The operator then places the cap of the grease cup open end downward over the upstanding column of grease and imparts a sidewise motion to it, thereby sweeping the grease off and causing it to adhere to the inside of the cap. This may be repeated as often as necessary to fill the cap. The grooves 17 are for accommodating the projecting ends of agitator wires which are employed in grease cups of some commercial types.

From the foregoing it is evident that with my device there is no need for the operator to soil his hands at any time nor is it necessary for him to use a stick for transferring grease from the can to the grease cup. The can in which the grease is bought virtually becomes, temporarily, a part of the filler itself and the grease is transferred directly from the can to the grease cup.

Of course the device may be used to fill other things than grease cups; for example, it may be used for filling grease guns—an implement of common use in connection with motor vehicles, and an inconvenient thing to fill.

It will be observed that in my device the plunger 12 always works within and contacts the sides of the sleeve 1, consequently, the apparatus does not depend for its smooth operation upon the accuracy of manufacture of the can. The can itself may be considerably indented without doing any harm for unless the indentations or irregularities are very great, the walls of the can will be straightened by the mere act of lowering the sleeve into the can. Again, the device promotes economy because no grease is wasted. In the complete form shown, the grease is delivered from the can in which it is purchased from the dealer, directly to the grease cup or other ultimate lubricating device.

In order to save weight it is desirable that the bars 22 be few in number and comparatively narrow as illustrated in Fig. 2. However, in cases where the grease is relatively heavy or the walls of the can relatively light it is obvious that the number of these bars may be increased or their width may be increased so as to cover the entire side of the can.

My device has another advantage, in that the sleeve, being usually of cast metal is of great stiffness and rigidity, and therefore forms an internal brace for the grease can and prevents indentations in the latter due to the contact with extended objects when in the tool box of an automobile and in other situations common in garages and machine shops.

Having thus described my invention, what I claim as new and desire to secure by Letters Patent, is:—

1. Means for discharging the contents of a cylindrical, open top container, said means comprising a cover for the top of the container, said cover having a groove for the reception of the upper edge of the container, means for securing the container in the groove whereby the cover forms a tight closure for the container, a plunger adapted to enter the container, and a stem guided by said cover and operating said plunger, said stem and plunger having a passage through which the contents of the container may be discharged when the plunger is lowered in the container.

2. Means for discharging the contents of a cylindrical open top container, said means comprising a cover adapted to be rigidly fastened to the top of the container, said cover having a sleeve rigidly fastened to it fitting slidingly down within the container to strengthen it, a hollow stem passing up through the cover and having an external screw thread whereby when the stem is rotated it will be raised or lowered, and a plunger at the lower end of the stem fitting slidingly within the sleeve.

3. Means for discharging the contents of a cylindrical open top container, said means comprising a cover adapted to be rigidly fastened to the top of the container, said cover having a sleeve rigidly fastened to it fitting slidingly down within the container to strengthen it, a hollow stem passing up through the cover and having an external screw thread whereby when the stem is rotated it will be raised or lowered, a plunger at the lower end of the stem fitting slidingly within the sleeve, and a handle rigidly fastened to the top of the stem for rotating it.

4. Means for discharging the contents of a cylindrical open top container, said means comprising a cover adapted to be rigidly fastened to the top of the container, said cover having a sleeve rigidly fastened to it fitting slidingly down within the container to strengthen it, a hollow stem passing up through the cover and having an external screw thread whereby when the stem is rotated it will be raised or lowered, a plunger at the lower end of the stem fitting slidingly within the sleeve, a plate contacting the bottom of the container for bracing it, and means for rigidly connecting said plate to the sleeve.

5. In combination, a platform for supporting a container, a sleeve fitting into said container, a closure for the top of the sleeve, a plunger working in the sleeve, a hollow stem fastened to the closure and adapted to reciprocate the plunger, a flange on said closure passing down along the outside of the container, and bars extending from the platform to said flange for rigidly connecting the parts together.

6. In combination, a platform adapted to support a container, a sleeve adapted to fit into the container, a plunger working in the sleeve, a hollow stem for reciprocating the plunger, a closure for the top of the sleeve, said closure having a depending portion passing down along the outside of the container, and set screws screwing in said depending portion for securing the closure to the container.

7. In combination, a platform provided with a clamp for securing it to a ledge such as the running board of a motor vehicle, said platform being adapted to support a container, a sleeve fitting into the container, a plunger working in the sleeve, a stem for reciprocating the plunger, said stem being hollow, to enable it to discharge the contents of the container, a closure for the top of the sleeve, said closure having a flange passing down along the outside of the container, and means for fastening the container to the sleeve.

8. In combination, a commercial grease can of cylindrical form, open at the top, the sides of the can extending down below the bottom whereby a depending rim is formed, a platform for supporting the can, said platform having an annular groove for accommodating the rim of the can, a closure for the top of the can, a plunger in the can, having a hollow stem extending upward through the closure, and means for rigidly connecting the closure and the platform whereby the closure will hold the rim of the can down in the groove of the platform.

9. In combination, a commercial grease can of cylindrical form, open at the top, the sides of the can extending down below the bottom, whereby a depending rim is formed, and the can having an annular socket adjacent to the wall of the can, a platform for supporting the can, said platform having an annular groove for receiving the depending rim of the can, and also having a bench for receiving the socket formed in the can bottom, a sleeve fitting into said can, the lower end of the sleeve fitting into the socket in the can bottom to make a tight closure therewith, a plunger working in said sleeve and provided with a hollow stem for actuating it, a closure for the top of the can and means for holding the closure down relatively to the platform to hold the can securely seated upon the platform.

10. A grease cup filler having means for containing the grease, a plunger working therein, a hollow stem for reciprocating said plunger, a platform at the top of the stem, surrounding the opening in it and constituting a wiper top, said wiper top having radial grooves for the purpose described.

11. In combination, a platform for supporting a can of lubricating grease, a sleeve adapted to fit into the can, a cover for the sleeve adapted to form a closure for it, means outside of the can for rigidly connecting the cover to the platform, a plunger working in said sleeve, and a hollow stem fastened to said plunger for reciprocating it, said stem being externally threaded and screwing in the cover of the sleeve, the stem having a table at its upper end surrounding the opening in the stem substantially as described.

12. In combination, a grease can having cylindrical sides extending below the bottom of the can to form a depending rim, the bottom of the can having a depending flange, fitting the sides of the can and being folded up around the lower edge of the can, a platform for supporting the can, said platform having a groove for the reception of the depending rim of the can, the bottom of the groove being V shaped for pinching the parts together when the can is forced down into it, a plunger reciprocating in said can, a closure for the can, a hollow stem passing through said closure and connected to the plunger for reciprocating it, and means for holding the closure in fixed position relatively to the platform for holding the can in place thereon.

13. Means for discharging the contents of a cylindrical, open top, closed bottom container, said means comprising a sleeve adapted to be plunged into the filled container from the top and fit the side walls thereof, a cover for said sleeve rigidly fastened thereto, means for fastening the container to the sleeve, a support for bracing the bottom of the container, said support being attachable and detachable to and from the cover, whereby the cover and the bottom support may be disconnected when the container is emptied so a fresh one can be put in place, a hollow stem screwing in through the cover and having a plunger at the lower end, said plunger fitting slidingly in the sleeve, and means at the top of the stem for rotating it.

In witness whereof I have hereunto subscribed my name.

FREDERICK K. LAWRENCE.